(12) United States Patent
Ehrman et al.

(10) Patent No.: US 11,913,219 B2
(45) Date of Patent: Feb. 27, 2024

(54) SELF-ADHERING DRAINAGE-PROMOTING WRAP

(71) Applicant: Benjamin Obdyke Incorporated, Horsham, PA (US)

(72) Inventors: Geoffrey Ehrman, Doylestown, PA (US); George Caruso, Ambler, PA (US)

(73) Assignee: BENJAMIN OBDYKE INCORPORATED, Horsham, PA (US)

( * ) Notice: Subject to any disclaimer, the term of this patent is extended or adjusted under 35 U.S.C. 154(b) by 271 days.

(21) Appl. No.: 17/343,848

(22) Filed: Jun. 10, 2021

(65) Prior Publication Data

US 2021/0388606 A1 Dec. 16, 2021

Related U.S. Application Data

(60) Provisional application No. 63/038,221, filed on Jun. 12, 2020.

(51) Int. Cl.
| | |
|---|---|
| *E04B 1/62* | (2006.01) |
| *B32B 7/06* | (2019.01) |
| *B32B 3/08* | (2006.01) |
| *B32B 5/02* | (2006.01) |

(52) U.S. Cl.
CPC .............. *E04B 1/625* (2013.01); *B32B 3/085* (2013.01); *B32B 5/022* (2013.01); *B32B 5/028* (2013.01); *B32B 7/06* (2013.01); *B32B 2260/021* (2013.01); *B32B 2260/046* (2013.01); *B32B 2307/54* (2013.01); *B32B 2307/5825* (2013.01); *B32B 2307/724* (2013.01); *B32B 2307/7265* (2013.01); *B32B 2405/00* (2013.01); *B32B 2419/00* (2013.01); *B32B 2419/06* (2013.01)

(58) Field of Classification Search
CPC ....... B32B 27/32; E02D 31/02; E04D 12/002; E04D 11/02; E04D 11/002
See application file for complete search history.

(56) References Cited

U.S. PATENT DOCUMENTS

| | | | | |
|---|---|---|---|---|
| 4,840,515 A | * | 6/1989 | Freese | E02D 31/02 405/36 |
| 4,956,951 A | * | 9/1990 | Kannankeril | E02D 31/02 405/36 |
| 5,374,477 A | | 12/1994 | Lawless et al. | |
| 6,355,333 B1 | | 3/2002 | Waggoner et al. | |
| 6,786,013 B2 | | 9/2004 | Coulton | |
| 6,901,712 B2 | | 6/2005 | Lionel | |
| 7,607,270 B2 | * | 10/2009 | Ehrman | E04D 12/002 52/302.1 |
| D657,958 S | | 4/2012 | Ehrman et al. | |

(Continued)

FOREIGN PATENT DOCUMENTS

WO WO-9915600 A1 * 4/1999 ............ C09J 7/0217

*Primary Examiner* — Babajide A Demuren
(74) *Attorney, Agent, or Firm* — Howson & Howson LLP (57) ABSTRACT

A self-adhering drainage-promoting wrap for a building structure includes an elongate, flexible strip of weather-resistive membrane having front and rear faces, a series of separate, spaced-apart, spacer elements bonded to the front face of the membrane and projecting therefrom to a predetermined height, and a layer of adhesive on the rear face of the membrane. Wall and roof assemblies including the self-adhering drainage-promoting wrap are also provided.

18 Claims, 4 Drawing Sheets

(56) References Cited

U.S. PATENT DOCUMENTS

| | | |
|---|---|---|
| 8,277,915 B2 | 10/2012 | Couturier |
| 8,919,061 B2 | 12/2014 | Kortuem et al. |
| 9,144,954 B2 | 9/2015 | Xiang Li |
| 9,314,994 B2* | 4/2016 | Strait ................... B32B 15/14 |
| 9,415,563 B2 | 8/2016 | Xiang Li |
| 9,562,174 B2 | 2/2017 | Russell |
| 9,592,529 B2 | 3/2017 | Xiangli |
| 10,161,129 B2* | 12/2018 | Hickie ................ B32B 27/302 |
| 10,676,918 B2 | 6/2020 | Caruso |
| 11,186,998 B2* | 11/2021 | Norwood ............. E04F 13/072 |
| 11,274,437 B2* | 3/2022 | Gonzales ................ B32B 27/12 |
| 11,619,022 B2* | 4/2023 | Jablonka .............. E02D 31/004 |
| | | 405/36 |
| 2004/0148887 A1* | 8/2004 | Di Pede ................. B32B 11/10 |
| | | 428/59 |
| 2004/0180195 A1 | 9/2004 | Macuga |
| 2005/0066593 A1* | 3/2005 | Haas ..................... E04D 15/02 |
| | | 52/198 |
| 2008/0092474 A1* | 4/2008 | Gan ..................... E04D 12/002 |
| | | 52/413 |
| 2012/0297711 A1 | 11/2012 | Ehrman et al. |
| 2013/0180203 A1* | 7/2013 | Xiangli ................... E04B 1/62 |
| | | 427/256 |
| 2014/0134408 A1 | 5/2014 | Milne et al. |

* cited by examiner

SELF-ADHERING DRAINAGE-PROMOTING WRAP

CROSS REFERENCE TO RELATED APPLICATIONS

This application claims the benefit under 35 USC § 119(e) of U.S. Provisional Patent Application No. 63/038,221 filed Jun. 12, 2020.

BACKGROUND

The present invention relates to moisture management within a building structure such as an exterior wall, roof or like structure of a building.

A wall, roof or like structure of a building may include an inner sheathing member to which an exterior building material, such as exterior cladding or the like, is applied to form an exterior envelope or outer surface of the building. During wall or roof assembly, it is common practice to apply an intermediate water resistive covering or like layer over the inner sheathing members such that the water resistive covering is located between the inner sheathing members and the exterior cladding or like exterior building material. By way of example, the coverings may include building paper, tar paper, roofing felt, house or building wrap materials, and the like.

In some instances, moisture may penetrate the assembly and collect behind the cladding. For example, a so-called bulk water entry event may occur in which moisture penetrates the cladding during wind driven rain or the like entering via a leak or cladding failure. Moisture that penetrates the structure will prematurely deteriorate the wall, roof or like building structure and permit mold growth if the moisture is permitted to accumulate therein.

For purposes of preventing moisture accumulation within such structures, a layer of an openwork material may be applied over the water resistive covering before the exterior cladding is installed to thereby create drainage passageways and an open air space within the wall, roof or like building structure directly behind the exterior cladding. When such a material is installed within a wall, roof or like building structure, moisture penetrating the cladding is permitted to drain and/or evaporate and a better building envelope is provided that improves the sustainability of the building structure or home.

SUMMARY

According to an embodiment, a self-adhering drainage-promoting wrap for a building structure includes an elongate, flexible strip of weather-resistive membrane having front and rear faces, a series of separate, spaced-apart, spacer elements bonded to the front face of the membrane and projecting therefrom to a predetermined height, and a layer of adhesive extending on the rear face of the membrane.

According to some contemplated embodiments of the wrap, the layer of adhesive may be a vapor permeable acrylic adhesive that extends continuously on the rear face of the membrane and completely covers the rear face. In addition, the layer of adhesive may include a scrim embedded therein for adding tensile and tear strength to the drainage promoting wrap. Further, the predetermined height of the spacer elements may be equal to or greater than a thickness of the layer of adhesive, and the layer of adhesive may be covered with release liner permitting split release.

According to another embodiment, a wall or roof assembly of a building is provided and includes an inner sheathing member and an exterior building material secured over the inner sheathing member and covering the inner sheathing member. The assembly also includes a self-adhering drainage-promoting wrap applied within the assembly between the inner sheathing member and the outer building material. The wrap may include an elongate, flexible strip of weather-resistive membrane having front and rear faces, a series of separate, spaced-apart, spacer elements bonded to the front face of the membrane and projecting therefrom to a predetermined height to provide drainage passageways between the front face of the wrap and the outer building material, and a layer of adhesive extending on the rear face of the membrane which secures the wrap to the inner sheathing member.

BRIEF DESCRIPTION OF THE DRAWINGS

The features and advantages of the present invention should become apparent from the following description when taken in conjunction with the accompanying drawings, in which.

DETAILED DESCRIPTION

According to an embodiment, a self-adhering moisture management building material or drainage-promoting wrap is provided for installation within an assembly of an exterior wall, roof, or like building structure. The wrap includes a membrane, a layer of adhesive on one face of the membrane, and a series of spacer elements on an opposite face. The adhesive is initially covered by a release liner such that, when the release liner is removed thereby exposing the adhesive, the wrap can be applied to an inner sheathing member of a building structure in a peel-and-stick manner. The spacer elements ensure an open space is provided within the building structure to enable ready drainage and evaporation of any moisture that may penetrate the assembly.

The self-adhering moisture management building material or drainage-promoting wrap may be provided in a generally flexible sheet form of a relatively long length that may be provided in a compact spiral roll for efficient storage and shipment of a bulk quantity of the material to a building site. In use, the wrap may be unrolled at the building site during installation as a weather barrier building envelope covering during the assembly of an exterior wall, roof or like building structure.

Membrane

The wrap 10 includes a weather or water resistive membrane 12 having a face 14 for confronting outer cladding or the like of a building structure and an opposite face 16 to which a layer of adhesive 18 is applied. The adhesive layer 18 is provided to secure the wrap 10 to inner sheathing members of a building structure, and a series of spacer elements 20 are provided in a desired pattern on the face 14 of the membrane 12 for engaging outer cladding of the building structure. The spacer elements 20 ensure that an open drainage space or gap is formed between the face 14 of the membrane 12 and the confronting cladding thereby permitting drainage and evaporation of any moisture that gains entrance or penetrates the assembly.

The membrane 12 may provide a water and/or air infiltration barrier that resists passage or infiltration of water, moisture and/or air from the exterior environment surrounding the building structure to the interior of the building. Thus, the membrane 12 protects the inner sheathing members and like building elements of the building from damage or rot due to moisture penetrating the exterior cladding or like exterior building material which is exposed to the outside environment and weather conditions.

The membrane 12 can also resist air infiltration and thereby contribute to a building's energy efficiency. In addition, the membrane 12 may be made of a breathable material that permits water vapor within the building being driven in an outward direction to escape through the membrane 12. Such water vaper will condense within the open drainage gap behind the exterior cladding of the wall or roof structure adjacent the face 14 of the membrane 12 so that, the moisture is able to drain or evaporate.

The membrane 12 may be made of any weather barrier or water resistive sheet material that is sufficiently flexible so as to be able to be stored and shipped in a spiral roll and applied as a wrap over the inner sheathing members of a building. The membrane 12 is typically provided as an indefinite, relatively-long length, elongate web of material that can be applied in continuous horizontally-extending rows across the inner sheathing members of the building. Merely by way of example, the total length of the membrane 12 within a new spiral roll may be about 100 feet and it can have a width of 3, 5, 9 or 10 feet. Of course, other dimensions are also possible.

The membrane 12 can be made of paper, tar paper, felt, roofing felt, a polymeric material, a thermoplastic material, a synthetic resin, olefin resin, polyolefin polymer, polypropylene, high density polyethylene, polystyrene, nylon, PVC or like house-wrap material. In addition, the membrane 12 can be a woven material, a non-woven material, a dry-laid non-woven material, a wet-laid non-woven material, a hybrid non-woven material, a polymer-laid non-woven material, a spun-bonded non-woven material, a flash-spun non-woven material, or the like.

According to one contemplated embodiment, the membrane 12 has a trilaminate configuration including a breathable film sandwiched between two layers of non-woven materials. During manufacture of the trilaminate membrane, the breathable film enables bonding of the first non-woven material layer to the second non-woven material. The film may be made of a polymeric material, a thermoplastic material, a synthetic resin, olefin resin, polyolefin polymer, polypropylene, high density polyethylene, polystyrene, nylon, PVC, or any other material that enables the first and second non-woven material layers to be bonded together.

Spacer Elements

The spacer elements 20 may be applied to the face 14 of the membrane 12 during the manufacture of the moisture management building material 10 such that the spacer elements 20 are bonded to, and integral with, the membrane 12. Thus, the spacer elements 20 are present within the spiral roll as carried by the membrane 12. Thus, installation of the membrane 12 on inner sheathing members at a building site necessarily also simultaneously accomplishes installation of the spacer elements 20 thereby reducing installation time and costs.

When the wrap 10 is installed within a building structure, such as an exterior wall of a building, the spacer elements 20 space exterior cladding or like exterior building material from the face 14 of the membrane 12. The spacing created by the spacer elements 20 provides a path for moisture to feely drain and/or air to flow within wall assembly or like building structure. This is typically located directly behind the exterior cladding, thereby preventing moisture accumulation behind the cladding. For example, moisture penetrating the exterior cladding, or moisture vapor passing from the interior of the building through the membrane 12, may accumulate or condense on or adjacent the face 14 of the membrane 12. However, the spacing provided by the spacing elements 20 permits moisture to drain along the face 14 of the membrane 12 such as under the force of gravity behind the cladding. Air circulation within this open space also evaporates and removes moisture.

For purposes of example, the open space or gap provided by the spacer elements 20 between the face 14 of the membrane 12 and the exterior cladding may be about 1 mm or greater. Of course, the amount of spacing can be altered as desired by altering the height to which the spacer elements 20 extend from the face 14 during formation of the wrap 10. A height of about 1 mm of the spacer elements 20 is believed to provide a balance between needed spacing to ensure proper, quick, and efficient drainage and economic considerations in manufacturing the moisture management building material 10.

According to an embodiment, the spacer elements 20 may be formed of a solidified hot-melt or drop coated polymer material, such as a hot-melt adhesive or the like, initially applied in a liquid or semi-liquid form to the face 14 of the membrane 12 before solidification. As an example, the spacer elements 20 may be formed of a polyolefin.

The pattern of spacer elements 20 applied to the membrane 12 needs to ensure that the spacer elements 16 are substantially uniformly located along the face 14 of the membrane 12 so that the desired spacing is provided continuously throughout the building structure. However, the spacer elements 20 preferably only cover a minimum amount of the surface area of the face 14 of the membrane so that the spacer elements 20 do not create areas where moisture may become trapped due to the presence of the spacer elements 20 and because the spacer elements 20 must permit the membrane 12 to remain breathable with respect to water vapor being driven outward from within the building through the membrane 12.

Figure 1:
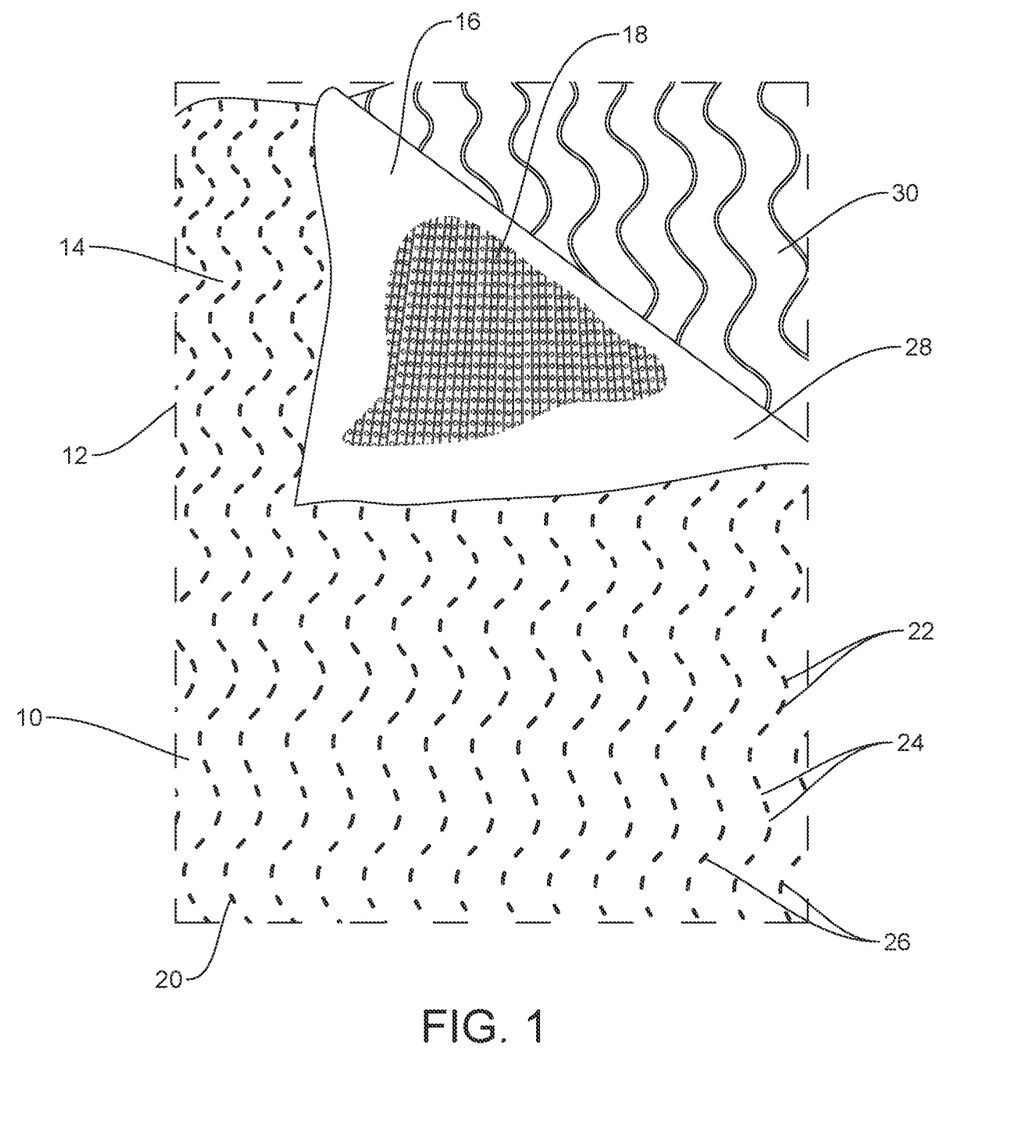
FIG. 1 is a perspective view of a self-adhering drainage-promoting wrap according to an embodiment.

As shown in FIG. 1, the spacer elements 20 can be applied in the form of short-length, individual, line-segments or dashes 22 which are completely separate and spaced from one another. The open space between and around adjacent dashes 22 provides openings 24 through which moisture can drain and ambient air can flow. The dashes 22 can be arranged to provide a pattern of discontinuous lines 26 generally extending along the length direction of the membrane 12 or throughout the height of the membrane 12. Of course, the discontinuous lines 26 of separate dashes 22 of spacer elements 20 can also extend diagonally across the face 14, randomly across the face 14, or in any other pattern.

According to one contemplated pattern of spacer elements 20, the dashes 22 can be uniformly arranged in a series of discontinuous undulating, wavy or sinusoidal lines 26. The corresponding dashes 22 in each adjacent line 26 can be aligned relative to each other in a manner creating unobstructed vertical drainage passages across the face 14 of the membrane 12. Alternatively, the dashes 22 in adjacent lines 26 can be staggered.

By way of example, the length of each dash 22 may be about 0.4 inch or 10 mm and the spacing or opening 24 between each pair of dashes in the same line 26 may be about 0.4 inch or 10 mm. The thickness or height of each dash may be about 0.04 inch or 1 mm. The spacing between each discontinuous sinusoidal line 26 of dashes 22 may be about 1 inch and the amplitude of each wave of the line 26 may be about 1 inch. The wavelength of each line 24 may be about 4 inches. Of course, all these dimensions are subject to change, as needed.

Adhesive Layer

According to an embodiment, the self-adhering moisture management building material or drainage-promoting wrap 10 may be provided with a continuous layer of adhesive 18 on the face 16 of the membrane 12. As an example, the layer of adhesive 18 may be provided by a continuous vapor permeable acrylic adhesive. This ensures that water vapor can escape from an interior of the building through the wrap 10.

Figure 2:
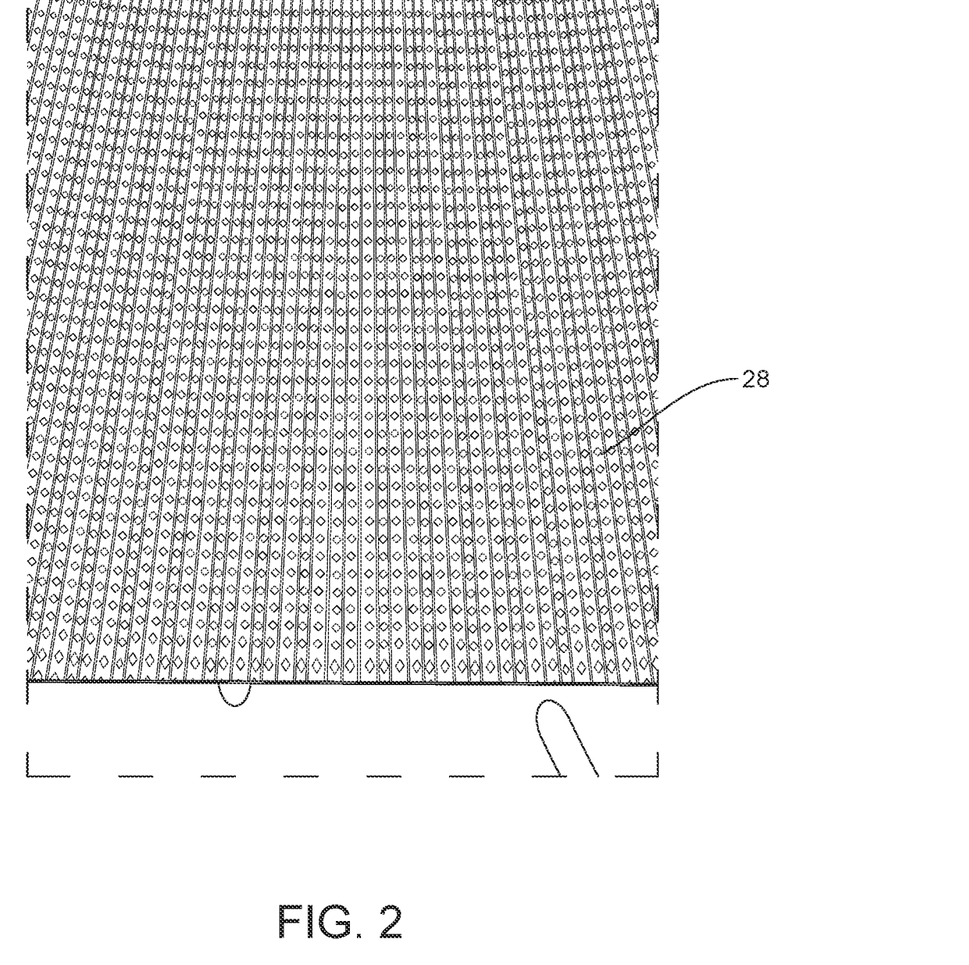
FIG. 2 is an enlarged perspective view of scrim used in making the wrap of FIG. 1.

As shown in FIGS. 1 and 2, the layer of adhesive 18 may include a scrim 28 embedded in the continuous layer of adhesive 18. The scrim 28 provides added tensile and tear strength to the wrap 10.

Accordingly, when the wrap 10 is adhered to inner sheathing of a building structure, a continuous air barrier is provided. The continuous layer of adhesive 18 also automatically provides an air and water resistant sealing around any fasteners that me pierce the wrap 10 thereby providing a self-sealing function that ensures that the water and air infiltration barrier provided by the membrane 12 is maintained. The adhesive layer with embedded scrim further prevents undesired tearing of the wrap 10.

The continuous layer of adhesive 18 enables the wrap 10 to be applied in a flat condition thereby eliminating any billowing of the wrap, tears during installation, and wind damage while exposed during installation. In addition, the adhesive 18 eliminates the need for seam tape or housewrap fasteners.

According to an embodiment, the height of spacer elements 20 projecting from the face 14 of the membrane is equal to or greater than the thickness of the layer of adhesive 18 (including the embedded scrim 28). Thus, the layer of adhesive 18 including the scrim 28 has a thickness that is 1 mm or less.

Release Liner

Before installation of the wrap 10, a release liner 30 is provided over the continuous layer of adhesive 18. Thus, installation of the wrap 10 is a peel-and-stick operation (i.e., peel the release liner 30 from the wrap 10 to expose the adhesive 18 and stick the newly exposed adhesive 18 to the inner sheathing of the building structure).

The release liner 30 may be provided as a paper or plastic-based film sheet that is applied during the manufacturing process of the wrap 10 and is used to prevent the otherwise sticky adhesive layer 18 of the wrap 10 from prematurely adhering to a surface. The release liner 30 may be coated with a release agent, which provides a release effect against any type of adhesive.

According to an embodiment, the release liner 30 provides for split release and is provided with a score line 32 or slit in the release liner 30 adjacent a lengthwise edge 34 of the wrap 10. See FIG. 3. The lengthwise edge 34 is preferably the upper edge of the wrap as installed. The split release is strategically placed to enable partial liner removal for easier handling and positioning of the wrap prior to final and full application.

Figure 3:
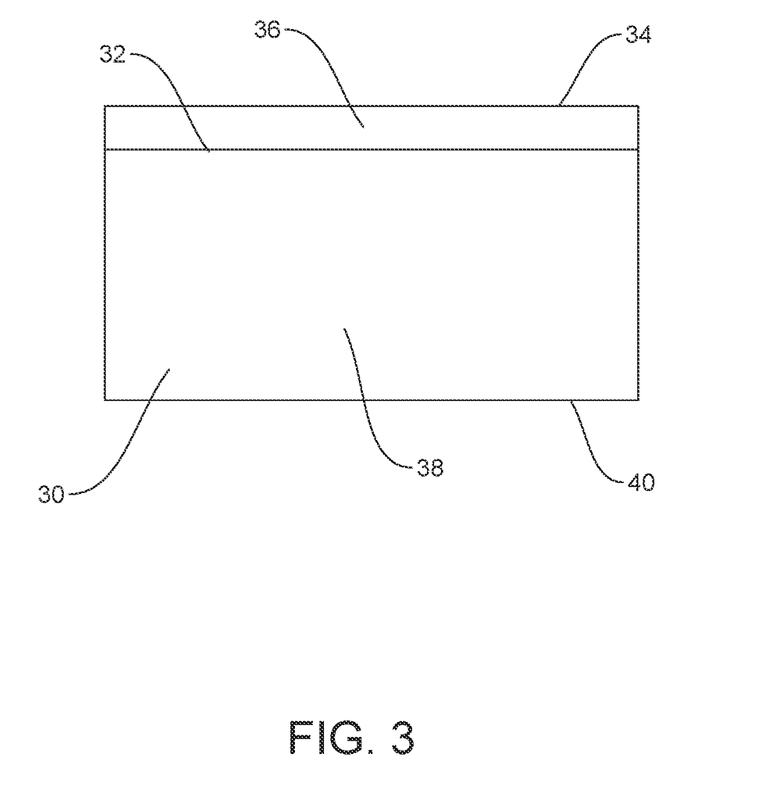
FIG. 3 is a schematic view showing the location of a split release on the release sheet of a wrap according to an embodiment.

Accordingly, for purposes of ease of installation, an upper part 36 of the release liner 30 may be peeled away and removed to expose a relatively narrow strip of the adhesive 18 at the upper edge of the wrap 10. This enables a relatively narrow strip at the top of the wrap 10 to be adhesively secured to the inner sheathing member of the building structure along a length of the wrap 10. The narrow strip of adhesive is sufficient to hold the wrap 10 in place on the inner sheathing members. Thereafter, both of the hands of the installer are now free to peel a relatively larger lower part 38 of the release liner 30 from the wrap 10 and to secure the wrap against the inner sheathing members in a flat and smooth manner without creation of wrinkles or the like.

According to an embodiment, the score line 32 extends parallel to the upper edge 34 of the wrap 10 and is located closer to the upper edge 34 than an opposite lower edge 40 of the wrap 10. Thus, the lower part 38 of the release liner 30 is larger than the upper part 36. By way of example, the score line 32 can be spaced about 12 inches or less from the upper edge 34 of the wrap 10. Of course, the score line 32 can be spaced closer or further from the upper edge 34, as desired. For example, the score line 32 may be located 6 inches or less, 3 inches or less, or 1 inch from the upper edge.

According to another embodiment, the score line 32 may be a perforated score line (i.e., a release liner with a perforated split). A continuous score line may be formed in a release liner by cutting the release line in a manufacturing line after the release liner has been applied to the layer of adhesive on the wrap. However, a perforated split release liner can be formed in advance (i.e., the perforations are formed in the release liner in advance) and then the liner with perforated score line is applied to the adhesive layer without needing any additional cuts to be made to the release liner in the manufacturing line of the wrap. In addition to this manufacturing benefit, a perforated split release liner enables the installer (i.e., builder/contractor) to have the option of using the split or not. This is because the perforated score line will only become a split if the installer intentionally pulls it apart. For instance, once the tear at the perforated liner starts, it would be easy to propagate along the perforated score line. Thus, this provides the installer with the option to use the split during install or just pull off the entire release liner (without initiating a tear along the perforated score line).

Building Structure Assembly

Figure 4:
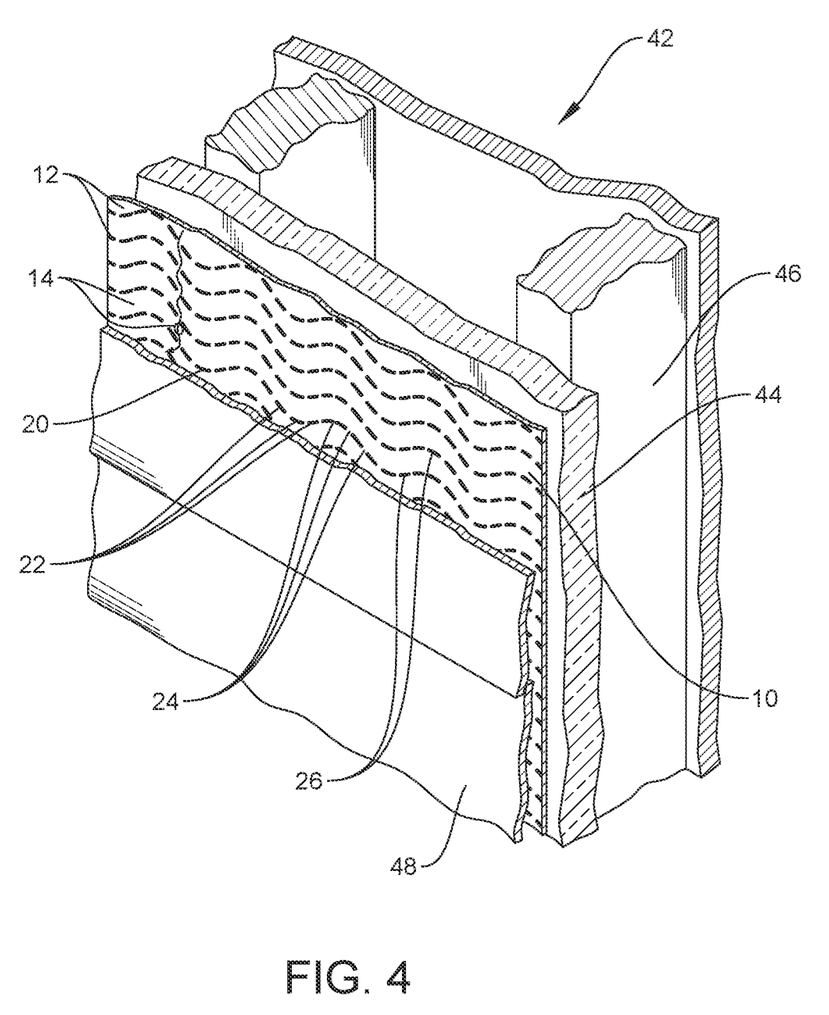
FIG. 4 is a cross-sectional view of a wall assembly according to an embodiment.

According to an embodiment, an assembly 42 of an exterior wall of a building is illustrated in FIG. 4 and demonstrates the use of the moisture management building material 10. This or a similar assembly may also be utilized for an exterior roof or other structure of a building. The assembly 42 includes generally-planar, sheet-like, inner sheathing members 44 affixed to vertically extending support posts 46. The inner sheathing members 44 are typically formed of panels of plywood, oriented strand board, particle board, insulated concrete, or other materials permitted by local building codes.

During installation of the assembly 42, the moisture management building material 10 is unrolled and secured with the continuous layer of adhesive 18 as a covering on the inner sheathing members 44 such that the membrane 12 completely covers and is adhered to the inner sheathing members 44 and such that the spacer elements 20 face toward the building exterior.

Typically, the wrap 10 is secured to the inner sheathing members 44 such that it extends continuously in a horizontal direction within the assembly 42. Several overlapping, horizontally-extending rows of the wrap 10 will typically be required to cover the entire elevation of the wall assembly 42. As stated above, the split release of the release liner 30 can be utilized to allow the upper edge of the wrap 10 to be secured to the inner sheathing members 44 before the remaining part of the release liner is removed to enable the full wrap to be adhered to the inner sheathing members 44.

An exterior building material 48, such as cladding, is affixed on the outer side of the assembly 42 such that it overlies the wrap 10 and sandwiches the wrap 10 between the inner sheathing member 44 and exterior cladding 48. The exterior cladding 48 may be, for instance, a wood or fiber-cement siding product or wooden shingles such as cedar shakes. The exterior building material 46 can also be brick, stone, stucco, exterior insulation finish systems (EIFS), vinyl, metal, asphalt, rubber, thermoplastic, and other exterior siding or roofing material.

As described above and shown in FIG. 4, the spacer elements 20 space the face 14 of the membrane 12 from the exterior cladding 48, and the spaces, gaps, or openings 24 between the spacer elements 20 provide drainage and ventilation paths within the assembly 42. Any moisture which penetrates the cladding 48 is provided with a path to drain downwardly under the force of gravity and out of the assembly 42. The space created by the spacer elements 14 also enables the circulation of air between the inner sheathing members 44 and exterior building material 48 to aid in drying or evaporating any moisture present within the assembly 42. The spacer elements 20 and openings 24 are located relatively uniformly along the face 14 under the cladding 48.

Accordingly, the above-described self-adhering drainage-promoting wrap and wall and roof assemblies according to the present invention provide a cost effective building product for use in managing moisture within wall, roof, and other exterior building structures.

While preferred wraps and assemblies have been described in detail, various modifications, alterations, and changes may be made without departing from the spirit and scope of the present invention as defined in the appended claims.

The invention claimed is:

1. A drainage-promoting wrap for a building structure, comprising:
   an elongate, flexible strip of weather-resistive membrane having front and rear faces;
   a series of separate, spaced-apart, spacer elements bonded to said front face of said membrane and projecting therefrom to a predetermined height; and
   a layer of adhesive extending on said rear face of said membrane;
   wherein said layer of adhesive extends continuously on said rear face of said membrane; and
   wherein said membrane has a trilaminate construction including a breathable film sandwiched between a pair of non-woven material layers such that one of said non-woven material layers forms said front face of said membrane and the other one of said non-woven material layers forms said rear face of said membrane.

2. The drainage-promoting wrap according to claim 1, wherein said layer of adhesive is a vapor permeable acrylic adhesive.

3. The drainage-promoting wrap according to claim 2, wherein said layer of adhesive completely covers said rear face.

4. The drainage-promoting wrap according to claim 2, wherein said predetermined height of said spacer elements is equal to or greater than a thickness of said layer of adhesive.

5. The drainage-promoting wrap according to claim 2, further comprising a scrim for adding tensile and tear strength to the drainage promoting wrap is embedded within said layer of adhesive.

6. The drainage-promoting wrap according to claim 5, further comprising a release liner covering said layer of adhesive.

7. The drainage-promoting wrap according to claim 6, wherein said release liner includes a score line providing split release of said release liner.

8. The drainage-promoting wrap according to claim 7, wherein said membrane includes opposite, substantially parallel, lengthwise-extending edges, wherein said score line extends substantially parallel to said edges, and wherein said score line extends closer to one of said edges than the other.

9. The drainage-promoting wrap according to claim 8, wherein said score line is located 12 inches or less from one of said edge, and wherein said score line is a perforated score line.

10. The drainage-promoting wrap according to claim 6, wherein said membrane having said spacer elements, said layer of adhesive, said scrim embedded within said layer of adhesive, and said release liner is storable in a spiral roll, and wherein said membrane is water impermeable in a direction through the membrane from said front face to said rear face and is water vapor permeable in a direction through the membrane from said rear face to said front face.

11. The drainage promoting wrap according to claim 1, wherein said spacer elements are formed of a hot-melt or drop-coated polymer material.

12. The drainage-promoting wrap according to claim 1, wherein said spacer elements are arranged in a pattern forming a series of separate, spaced-apart dashed lines, and wherein spacing between adjacent spacer elements in the same dashed line and in adjacent dashed lines form drainage passages therebetween adjacent said front face of said membrane.

13. The drainage-promoting wrap according to claim 1, wherein said predetermined height of said spacer elements is 1 mm or greater.

14. An assembly of an exterior building structure, comprising:
   an inner sheathing member;
   an exterior building material secured over said inner sheathing member and covering said inner sheathing member; and
   a drainage-promoting wrap applied within the assembly between said inner sheathing member and said outer building material;
   said wrap comprising an elongate, flexible strip of weather-resistive membrane having front and rear faces, a series of separate, spaced-apart, spacer elements bonded to said front face of said membrane and projecting therefrom to a predetermined height to provide drainage passageways between said wrap and said outer building material, and a layer of adhesive extending on said rear face of said membrane securing said wrap to said inner sheathing member;

wherein said layer of adhesive is a vapor permeable acrylic adhesive that extends continuously on said rear face of said membrane and completely covers said rear face;

wherein said layer of adhesive includes a scrim embedded therein for adding tensile and tear strength to the drainage promoting wrap; and wherein said predetermined height of said spacer elements is equal to or greater than a thickness of said layer of adhesive.

15. The assembly according to claim 14, wherein said membrane is water impermeable in a direction through the membrane from said front face to said rear face and is water vapor permeable in a direction through the membrane from said rear face to said front face, and wherein said membrane has a trilaminate construction including a breathable film sandwiched between a pair of non-woven material layers such that one of said non-woven material layers forms said front face of said membrane and the other one of said non-woven material layers forms said rear face of said membrane.

16. The assembly according to claim 15, wherein said spacer elements are formed of a hot-melt or drop coated polymer material and are arranged in a pattern forming a series of separate, spaced-apart dashed lines, and wherein spacing between adjacent spacer elements in the same dashed line and in adjacent dashed lines form drainage passages therebetween adjacent said front face of said membrane.

17. The assembly according to claim 16, wherein said predetermined height of said spacer elements is at least 1 mm.

18. A drainage-promoting wrap for a building structure, comprising:

an elongate, flexible strip of weather-resistive membrane having front and rear faces;

a series of separate, spaced-apart, spacer elements bonded to said front face of said membrane and projecting therefrom to a predetermined height;

a layer of adhesive extending on said rear face of said membrane;

a scrim for adding tensile and tear strength to the drainage promoting wrap is embedded within said layer of adhesive; and a release liner covering said layer of adhesive;

wherein said layer of adhesive extends continuously on said rear face of said membrane and is a vapor permeable acrylic adhesive;

wherein said membrane having said spacer elements, said layer of adhesive, said scrim embedded within said layer of adhesive, and said release liner is storable in a spiral roll; and wherein said membrane is water impermeable in a direction through the membrane from said front face to said rear face and is water vapor permeable in a direction through the membrane from said rear face to said front face.

* * * * *